United States Patent Office 3,842,103
Patented Oct. 15, 1974

3,842,103
PROCESS FOR THE PREPARATION OF LEUCO
CRYSTAL VIOLET LACTONE
Geoffrey Smith, 36 Dorset Ave., Moss Side, and Thomas
Marley, Ashton New Road, Clayton, both of Manchester, England
No Drawing. Filed Nov. 16, 1971, Ser. No. 199,365
Claims priority, application Great Britain, Nov. 18, 1970,
54,820/70
Int. Cl. C09b 11/10
U.S. Cl. 260—391                              8 Claims

ABSTRACT OF THE DISCLOSURE

There is disclosed a method for the preparation of 2 - [4,4' - bis(dimethylamino)-benzohydryl]-5-dimethylaminobenzoic acid, wherein an aqueous solution of tetramethyl-4,4'-diaminobenzohydrol having a temperature of 10° C. to 25° C. and a pH of 1.5 to 2.0 is added to an aqueous solution of m-dimethylaminobenzoic acid having a temperature of 60° C. to 100° C. and a pH of 1.5 to 2.0. The prepared compound has a known utility as an ingredient of paper-coating compositions.

This invention relates to a method for the preparation of 2-[4,4' - bis(dimethylamino)-benzohydryl]-5-dimethylaminobenzoic acid, or, as this compound is more commonly designated, Leuco Crystal Violet Lactone.

The previously proposed method of preparing Leuco Crystal Violet Lactone involves the addition of solid tetramethyl - 4,4' - diaminobenzohydrol (Michler's Hydrol) to an acid solution of m-dimethylaminobenzoic acid at a temperature of approximately 85° C., the pH rising from about 0.8 to 1.8 during the addition. Unfortunately, Michler's Hydrol reacts very slowly with m-dimethylaminobenzoic acid at the lower pH and the reaction only proceeds at a reasonable rate towards the end of the addition when the optimum reaction conditions of pH 1.8 at 85° C. are reached. Thus a high concentration of Michler's Hydrol in hot dilute acid results under which conditions the Hydrol decomposes to dark coloured tars. There is a substantial loss of yield and the resulting product is of poor quality.

The present invention provides a process for the preparation of Leuco Crystal Violet Lactone, which comprises preparing separate solutions of m-dimethylaminobenzoic acid and Michler's Hydrol in dilute mineral acid such that each solution has a pH value of 1.5 to 2.0, preferably 1.8, heating the solution of the m-dimethylaminobenzoic acid to a reaction temperature of 60° C. to 100° C., preferably 80° C. to 90° C. and adding the cold solution (10° C. to 25° C.) of the Michler's Hydrol evenly over a period of several hours (1–4). The resulting Leuco Crystal Violet Lactone may be isolated by neutralisation of the reaction mixture with ammonia or other alkali. This method maintains the optimum reaction conditions during the slow addition of the Michler's Hydrol, which can thereby be added at a rate corresponding to the rate of reaction with the m-dimethylaminobenzoic acid. This results in a purer Leuco Crystal Violet Lactone in substantially higher yields.

The following example illustrates the invention:

EXAMPLE 32.3 parts of m-dimethylaminobenzoic acid are dissolved in a mixture of 98 parts of water and 10.8 parts of 98% sulphuric acid and the solution is adjusted to pH 1.8 and heated to 85° C. In a separate vessel, 50.5 parts of Michler's Hydrol in the form of a technical quality paste are dissolved in a mixture of 264 parts of water and 29.2 parts of 98% sulphuric acid, this solution being maintained at 20° C. throughout its preparation. The second solution is adjusted to pH 1.8 and is added at a constant rate to the solution of m-dimethylaminobenzoic acid over a period of three hours, maintaining the reaction temperature of 85° C. throughout. The resulting solution is maintained at 85° C. for a further two hours and then cooled to 5° C. The Leuco Crystal Violet Lactone is isolated by neutralisation with ammonia solution. The precipitate is isolated in the usual way and washed with cold water until free of sulphate ions. The crude filter cake contains approximately 60 parts of Leuco Crystal Violet Lactone.

What is claimed is:
1. A method for the preparation of 2-[4,4'-bis-(dimethylamino) - benzohydryl] - 5 - dimethylaminobenzoic acid, wherein an aqueous solution of tetramethyl-4,4'-diaminobenzohydrol having a temperature of 10° C. to 25° C. and a pH of 1.5 to 2.0 is added to an aqueous solution of m-dimethylaminobenzoic acid having a temperature of 60° C. to 100° C. and a pH of 1.5 to 2.0.
2. A method as claimed in claim 1, wherein solutions containing a mineral acid and having a pH of 1.8, are used.
3. A method as claimed in claim 1, wherein a solution of m-dimethylamino-benzoic acid having a temperature of 80° C. to 90° C. is used.
4. A method as claimed in claim 1, wherein the solution of tetramethyl-4,4'-diaminobenzohydrol is added over a period of 1 to 4 hours.
5. A method as claimed in claim 1, wherein the two reaction components are used in approximately molar ratio.
6. A method as claimed in claim 1, wherein the reaction mixture is neutralised by adding an alkali and the precipitated 2-[4,4'-bis-(dimethylamino)-benzohydryl]-5- dimethylaminobenzoic acid is isolated by filtration.
7. A method as claimed in claim 2 wherein the mineral acid is sulphuric acid.
8. A method as claimed in claim 6, wherein the alkali is ammonia.

References Cited
UNITED STATES PATENTS
2,417,897    3/1947    Adams _____ 260—391
2,458,328    1/1949    Adams _____ 260—391

LORRAINE A. WEINBERGER, Primary Examiner
L. A. THAXTON, Assistant Examiner